April 14, 1970    A. KORPEL    3,506,334
PHASED ARRAY-TYPE BEAM SCANNING
Filed Feb. 17, 1966

INVENTOR.
Adrianus Korpel
BY
Hugh H. Drake
Attorney

United States Patent Office 3,506,334
Patented Apr. 14, 1970

3,506,334
PHASED ARRAY-TYPE BEAM SCANNING
Adrianus Korpel, Prospect Heights, Ill., assignor to Zenith Radio Corporation, Chicago, Ill., a corporation of Delaware
Filed Feb. 17, 1966, Ser. No. 528,217
Int. Cl. G02f 1/28, 1/36
U.S. Cl. 350—160                                  18 Claims

ABSTRACT OF THE DISCLOSURE

Efficient scanning of a coherent light beam is obtained with a system in which the beam is introduced at an acute angle of incidence between a pair of mutually facing reflective surfaces. One surface is partially transmissive to allow a phased array of parallel beams to emerge and eventually form a resultant spot in the far field. The phase difference between these beams is made to vary by causing changes in the effective optical path length between the surfaces, or changes in frequency of the primary beam. The resultant will then form at different angular positions in the far field corresponding to the difference in phase which is introduced. Thus, scanning of the coherent light beam through a substantial angular range is obtained.

---

The present invention pertains to light beams devices. More particularly, it relates to devices through which time-coherent light is passed and which act to select or vary certain angular relationships between light beams entering and leaving the device.

One primary application of the invention is in the deflection or scanning of light beams and, for purposes of explanation herein, primary emphasis will be placed upon use in that environment. However, the operating principle involved is reversible as a result of which the invention also may be used to select from among light incoming from a variety of different angular directions. As used herein, the term "light" includes not only visible light but also that radiation of the same general character and having wavelengths either shorter or longer than those of visible light, including radiation in the infrared and ultraviolet regions.

Perhaps one of the earliest schemes for deflecting a beam of light was that of mechanically turning a mirror in order to reflect the light at successively different angles. Such a system indeed may be the simplest when the scanning rate is comparatively low. However, at higher scanning rates, such as those used for horizontal deflection in television systems, the inertias involved are too high to make that approach generally attractive. A more sophisticated scanning technique, not necessarily involving mechanically moving parts, is to diffract the beam with a grating having a variable diffraction constant. This has been accomplished, for example, by passing a light beam through sound waves propagating in water. As the frequency of the sound is varied, so is the angle of light diffraction. However, absent at least additional complexity of construction or operation, such devices are limited in attainable scanning speeds.

It is, therefore, a general object of the present invention to provide a new and improved light beam device of the aforementioned overall character.

A more specific object of the present invention is to provide a new and improved light beam scanner.

A related specific object of the present invention is to provide an improved angle-sensitive light receptor.

A light beam device constructed in accordance with the present invention includes a pair of mutually-facing substantially-parallel spaced mirrors one of which is partially transmissive of light. The mirrors are orientable relative to a beam of time-coherent light to establish multiple reflections of the light beam between the mirrors with a portion of the light being transmitted through the one mirror at each point of such reflections thereon. Finally, the device includes means for varying the effective optical path length between the mirrors.

The features of the present invention which are believed to be novel are set forth with particularity in the appended claims. The invention, together with further objects and advantages thereof, may best be understood, however, by reference to the following description taken in connection with the accompanying drawings in the several figures of which like reference numerals indicate like elements and in which:

Figure 1:
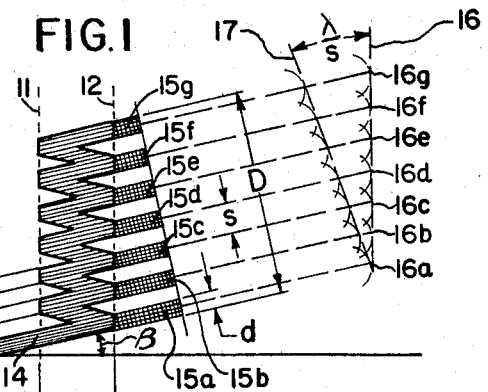
FIGURE 1 is a schematic diagram of one embodiment of the present invention.

The primary elements of the device of FIGURE 1 are a source 10 of time-coherent light and a pair of mutually-facing substantially parallel spaced mirrors 11 and 12. Mirror 12 is partially transmissive of the light from source 10. Source 10 advantageously is a laser which projects a beam 13 of the time-coherent light toward mirror 11.

Mirror 11 in this instance has an aperture 14 aligned to accept beam 13 and the mirrors are oriented relative to beam 13 at an angle β to establish multiple reflections of the beam between the mirrors, progressively from the bottom to the top as illustrated in FIGURE 1. At each of the points of reflection on mirror 12 a portion of the light is transmitted through that mirror to form a corresponding plurality of substantially parallel secondary beams 15a–g in the near-field beyond mirror 12. By virtue of the reflections and the time-coherence of the light, a relative phase difference exists between each successive different one of secondary beams 15a–15g. For a given light wavelength λ, angle of incidence β and mirror spacing L, the ultimate far-field beam resulting from a combination of the secondary beams has a wave front 16, effectively composed of the individual secondary-beam wave fronts 16a–16g, which propagates in a given direction normal to the surface it defines.

In practicing the invention, the effective optical path length between mirrors 11, 12 is varied. For a given change in that path length, the ultimate far-field beam resulting from the secondary beams exhibits a wave front 17 which has a propagation direction different from that of wave front 16. In this manner, the far-field beam is caused to scan or to be deflected over a range of angles lying in the plane of the paper in FIGURE 1.

While the definitions based upon beam fringing as against distance along the beam have been established to describe the length of the near-field for a light beam, in practice the transition from the group of highly-collimated near-field secondary beams to the ultimate resulting beam is a gradual transition. For clarity of illustration in FIGURE 1, the near-field condition beyond mirror 12 is illustrated by the double cross hatched lines and the continuation of the secondary beams beyond the near-field region is represented by dashed lines.

By assuming source 10 to represent a light detector instead of a laser, that is, to represent a source of electrical energy in response to the impingement of light energy, the embodiment of FIGURE 1 is operable in the reverse sense as a light antenna. In this mode of operation, incoming light energy impinging upon the external surface of mirror 12 and exhibiting wave front 16 forms an angle of incidence with mirror 12, for a given light frequency and spacing between the two mirrors, such that the portions of the incoming light transmitted through mirror 12 include quanta of light so related from one entrance point on mirror 12 to successively following entrance points that additive multiple reflections occur and combine to cause beam 13 to be projected through aperture 14 to the light detector. In this case, variation of the effective optical path length between mirrors 11 and 12 changes that angle from which incoming light must come in order to cause the necessary constructive interference resulting in the development of beam 13 to pass through aperture 14 and impinge upon the detector. Consequently, adjustment of the path length enables the device to act as a light receptor selective of light at a particular incidence angle. Keeping in mind this capability of reversal of function, as between a light scanner and an angle-sensitive light receptor, the following discussion for purposes of clarity will be restricted to the light-scanning versions.

In the particular embodiment of FIGURE 1, mirrors 11 and 12 are stationary and are spaced apart by a fixed distance. Scanning of the emerging light beam is caused to occur by changing the wavelength of the light from laser 10. In the typical gas laser in which a lasing gas is disposed between the mirrors of a Fabry Perot cavity, a change in laser frequency is exhibited with a change in cavity length, pulling the active lasing line away from the center of the atomic line of the lasing material. Alternatively, a change of frequency in discrete steps occurs when switching between the use of different spectral lines in the typical multimode laser. Similarly, the atomic line width in a conventional ruby laser is sufficient to enable the attainment of frequency change with laser length. The more recent diode lasers, as another alternative, have a capability of being somewhat easily shifted in frequency of their light output.

As a still further alternative, laser 10 may be a source of fixed-frequency light with other apparatus being utilized to shift the light frequency. One approach is that of diffracting the light by interaction with other wave energy such as sound waves travelling in a medium. The diffracted rays are shifted in frequency by an amount corresponding to the frequency of the sound. This approach in the present embodiment, however, requires the additional inclusion of means to counteract the deflection of the beam due to the diffraction so as to fix or at least enable control of the angle of incidence $\beta$ of the light into the system of mirrors 11, 12.

Figure 2:
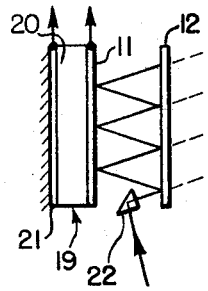
FIGURE 2 is a schematic representation of one of the elements included in FIGURE 1.

Instead of, or in addition to, changing the frequency of the light from source 10, the optical path length itself may be physically changed. One embodiment directed to this end is illustrated in FIGURE 2 wherein mirror 12 is stationary and mirror 11 is electrically conductive (or is formed on an electrically-conductive layer) and constitutes one electrode of a piezoelectric transducer 19. Transducer 19 includes a slab 20 of piezoelectric material and a second and stationary electrode 21 on the surface of the slab opposite electrode-mirror 11. The crystallographic orientation of slab 20 is selected so that the slab expands and contracts in the direction between its electrodes in response to the application of an electrical potential between the electrodes. Consequently, application of an electrical signal to the transducer causes the same to vary in thickness and this in turn changes the spacing between mirrors 11 and 12.

FIGURE 2 also illustrates an alternative manner of introducing the incoming light beam into the space between mirrors 11, 12. For this purpose, the light enters upon the system from a direction generally parallel to the plane of the mirrors and strikes a prism 22 disposed near one end of the space. The active reflecting surface of prism 22 is oriented to cause the light to be reflected onto mirror 12 at incident angle $\beta$. As in the case of FIGURE 1, the light is caused to multiply reflect through the mirror system with a portion of the light being transmitted through mirror 12 at each point of reflection. The application of an electrical signal to transducer 19 consequently varies the actual optical path length between the mirrors and results in angular deflection of the light beam in the manner already described with reference to FIGURE 1. In order to minimize multiple side lobes in the far-field beam pattern, it is advantageous to position prism 22 as close as possible to mirror 12.

Figure 3:
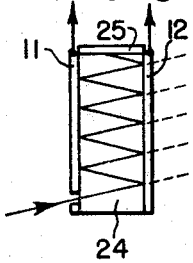
FIGURE 3 is a schematic representation of an alternative to the element shown in FIGURE 2.

In the modification of FIGURE 3, mirrors 11 and 12 are affixed to opposing faces of a body 24 of electro-optical material. As is the case with mirror 11 in FIGURE 2, mirrors 11 and 12 in FIGURE 3 are electrically conductive (or at least are mirror surfaces on electrically-conductive material) so as to form electrodes individually connected across a source of electrical potential and responsive thereto to develop the longitudinal electro-optic effect in body 24. Alternatively, the two electrodes are formed on the top and bottom surfaces of body 24 and the transverse electro-optic effect is used. In either case, the electric field developed between the electrodes in response to the applied electrical signal varies the index of refraction of body 24 and thereby likewise changes the optical path length between the mirrors. Suitable electro-optical materials with which the art already is familiar are those known as ADP, KDP and KTN. A more detailed description of an embodiment employing one of these materials is set forth hereinafter.

The embodiment of FIGURE 3 further includes a layer 25 of light absorbing material such as carbon black coated upon the end of body 24 toward which the light is progressively reflected. Layer 25 serves to absorb and hence prohibit re-reflection of that light which continues beyond the last point of transmission through mirror 12. A similar light-absorbing barrier may be disposed at the appropriate end of the space between the mirrors in any of the other embodiments.

Figure 4:
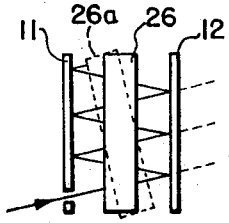
FIGURE 4 is a schematic representation of a still different alternative to the element of FIGURE 2.

A still different embodiment is illustrated in FIGURE 4 wherein mirrors 11 and 12 are stationary. In this case, an optical flat 26 is disposed generally between and parallel to the mirrors. A change in its angular position in the path of each of the multiply reflected beam segments, as indicated at 26a, serves to vary the actual optical path length. That is, the path length is varied by tilting flat 26 about an axis perpendicular to the plane defined by the multiply-reflected light segments. Such tilt changes the actual physical path length through the flat. Its action in the system is the same as if the spacing between the mirrors themselves was changed as in FIGURE 2. Otherwise, the embodiment including FIGURE 4 operates to cause light beam scanning in the same way as already discussed with reference to FIGURE 1.

Figure 5:
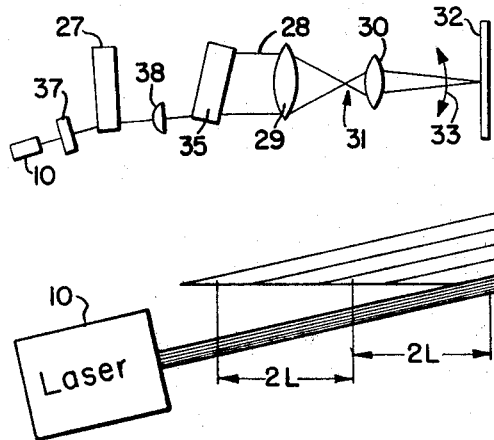
FIGURE 5 is a schematic diagram related to FIGURE 1 and depicting additional elements incorporated therewith in a scanning system.
Figure 6:
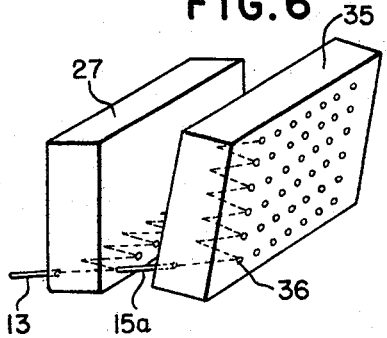
FIGURE 6 is a schematic representation of a portion of FIGURE 1 including a second scanning device enabling light beam deflection in two directions.

Thus far, attention has been directed to the scanning of the light beam in a single plane. Where one of the disclosed embodiments is utilized in a television system, for example, the described apparatus is appropriate for the horizontal deflection which customarily is at a much higher rate than that of the vertical deflection. For the latter, customarily at a rate of only 60 cycles per second, a simple oscillating mirror often is sufficient. However, when the deflection in the second direction, generally transverse to that occasioned by the action of the mirrors 11 and 12 of FIGURE 1, is at a higher rate, it is contemplated to utilize a second such unit properly oriented relative to the first so as to deflect the beam emerging from the first in the transverse direction. An embodiment of this concept is depicted in FIGURE 6 wherein, as in FIGURE 5, unit 27 includes a pair of spaced mirrors arranged as in any of FIGURES 1–4 and into which incoming light beam 13 is directed. Consequently, the output from unit 27 in the near-field is a plurality of secondary beams of which only beam 15a is illustrated for clarity; however the multiple reflections and the successive further points from which secondary beams emerge are in part illustrated schematically in FIGURE 6.

Cooperating with unit 27 in FIGURE 6 is a second unit 35 tilted relative to the first so that secondary beam 15a causes multiple reflections within unit 35 progressively in the vertical direction. The latter progressive reflection results ultimately in a succession of points 36 of light emergence from unit 35 as indicated in FIGURE 6 by the vertically aligned columns of small circles each representing one such point of emergence of that which may be termed tertiary beams.

Figure 10:
FIGURES 10 and 11 are side elevational views of elements which may desirably be used in systems employing the elements of the other figures.
Figure 11:
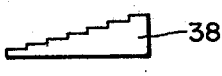

In practicing the embodiment of FIGURE 6, attention is given to the spread in the vertical direction of secondary beams 15a in order to optimize entrance conditions to the second unit 35. An attractive approach is to utilize for beam 13 a sheet beam having a large diameter in the vertical direction of FIGURE 6 together with the disposition of a cylindrical lens or telescope (see FIGURES 5 and 10) between units 27 and 35 to compensate for such spread in the vertical direction of the light.

Returning now with more particularly to the description of FIGURE 1, mirrors 11, 12 have amplitude reflectivities $R_1$ and $R_2$ and the mirrors together define a light aperture D. The incoming light beam 13 has a diameter $d$ as does each of secondary beams 15a–g, neglecting diffraction spread of the multiply-reflected beam segments between the mirrors. The separation $s$ between the secondary beams is in accordance with the expression:

$$s = 2L \sin \beta \tag{1}$$

In order to avoid resonant entrance conditions, care preferably is taken to insure that the beams do not overlap; thus, $s > d$.

A variation $\Delta L$ in the optical path length between mirrors 11, 12 introduces a progressive phase variation of $4\pi\Delta L/\lambda$ radians per secondary beam across aperture D. This in turn changes the propagation direction of the resultant far-field wave front by the value $2\Delta L/s$. The maximum usable phase difference between neighboring secondary beams is $\pm\pi$, corresponding to a $\Delta L$ of $\pm\frac{1}{4}\lambda$ and resulting in a maximum total scan angle of $\lambda/s$. In FIGURE 1, this is indicated by the angle between wave fronts 16 and 17.

The beam spread in the far-field is determined by the overall aperture width and equals $\lambda/D$. Hence, the number of resolvable scan angles N equals $D/s$, which is an expression for the number of secondary beams in the phased array of those beams.

The upper limit to the usable number of secondary beams depends upon whether the system is aperture limited or loss limited. When the system is aperture limited, i.e., the value of D is finite and $R_1 = R_2$ and these approach unity, the condition is that the last (top) beam in the array of secondary beams must not have a diffraction spread greater than that of the aperture itself; this is expressed:

$$N 2L\lambda / d < D \tag{2}$$

When the secondary beams just touch, i.e., $s = d$, this expression becomes $$N < (D^2 / 2L\lambda)^{\frac{1}{2}} \tag{3}$$

When, on the other hand, the system is loss limited (i.e., $D = \infty$ and $R_1 R_2$ is less than unity), the system performance is described by means of an effective aperture value $D_e$. It can be shown that the value $D_e$ is equal to the length (in the direction of the multiple reflections) of that part of mirror 12 for which the secondary beams are attenuated by less than the value $\pi$ nepers, as detailed more fully in "An Ultrasonic Light Deflection System" by A. Korpel, et al., IEEE Journal on Quantum Electronics, vol. QE-1, pp. 60–61, April 1965. In terms of the reflectivities $R_1 R_2$, $$D_e = \pi d / (1 - R_1 R_2) \tag{4}$$

and $$N_{max} = \pi / (1 - R_1 R_2) \tag{5}$$

With realizable reflectivities $R_1 R_2$ of 99.7%, $10^3$ resolvable scan angles are feasible for the system of FIGURE 1.

The aforesaid analysis neglects the presence of multiple lobes in the far-field. An exact analysis of the operation of the device conveniently uses the virtual secondary beam sources located on a line perpendicular to mirrors 11 and 12 and spaced 2L apart as depicted in FIGURE 1. Additional analysis reveals that the number of significant side lobes (i.e., comparable in intensity to the main beam) is approximately $2s/d$, and they are spaced $\lambda/s$ apart. The side lobes, however, are irrelevant to the basic operation of the device described except insofar as they represent loss in light intensity.

Summarizing for a moment, mirror 11 is essentially a perfect reflector and mirror 12 has a small but finite transmissivity such that, for example, approximately one-half of one percent of the light is transmitted at each reflection from mirror 12. The result is the production of a linear array of secondary beams transmitted through mirror 12 with a constant phase difference between adjacent beams of a value determined by the optical path difference between the mirrors along the tilt angle $\beta$. As will be shown, the number of resolvable scan angles is approximately equal to the number of secondary beams in the array emerging from mirror 12. The effective number of spots in the near-field is determined by the total reflectivity $R_1 \times R_2$ which in turn determines the distribution in the relative intensity of the beams in the scanning direction.

Figure 7:
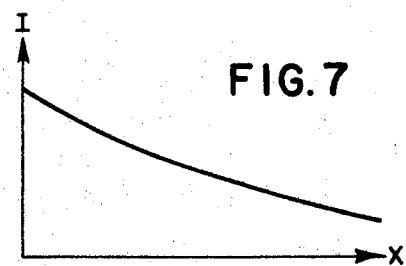
FIGURES 7, 8 and 9 depict light response curves useful in connection with the explanation of features of the present invention.

Neglecting for a moment diffraction spreading of the secondary beams, the distribution of intensity I in the scanning direction $x$ is represented in FIGURE 7, the point of the curve on the ordinate representing the primary or initial secondary beam 15a. Thus, the position in the transverse direction of the Nth beam is $x = (N-1)s$, where $s$ is 1, 2, 3, .... Since a constant fraction of the available light is extracted (transmitted through mirror 12) at each point of reflection, an exponential distribution results. Defining the attenuation constant $\alpha$ as the exponential coefficient in the intensity, the intensity of the Nth beam is:

$$I_N = I_1 e^{-\alpha x} = I_1 e^{-\alpha s(N-1)} \tag{6}$$

Since the ratio of intensities of adjacent beams is determined only by the reflectivity, $$I_{N+1}/I_N = (R_1 R_2)^2 = e^{-\alpha s} \tag{7}$$

In the limit of a large number of beams, in which case the reflectivity is very close to unity, the exponential in Equation 7 can be approximated by the leading term:

$$e^{-\alpha s} \cong 1 - \alpha s = (R_1 R_2)^2 \tag{8}$$

Solving for the attenuation constant, $$\alpha \cong 2(1 - R_1 R_2)/s \tag{9}$$

Figure 8:
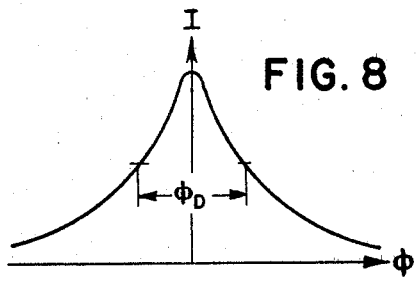

It can be shown that a continuous distribution of beams with an exponential intensity distribution produces a single spot in the far-field whose intensity distribution with change in angle is Lorentzian as illustrated in FIGURE 8. The angular width $\phi_D$ between half-power points of the far-field spot is related to the attenuation constant of the near-field distribution as follows:

$$\phi_D = \lambda \alpha / 2\pi = \lambda (1 - R_1 R_2)/\pi s \tag{10}$$

It is of interest to compare the spot produced in the far-field by a uniformly-illuminated aperture of width D in the near-field. The intensity distribution of such a spot varies as $(\sin x/x)^2$, such that the angular width $\phi_u$ between the half-power points, defined as ½ the angle between the first zero's of the $(\sin x/x)^2$ function, is:

$$\phi_u = \lambda/D \quad (11)$$

The angular widths between the half-power points for the two different intensity distributions discussed are equated to define the effective aperture width $D_e$ for the exponential distribution. $D_e$ represents the width of a uniformly-illuminated aperture required to produce the same size spot in the far-field as that which is obtained with the exponential distribution. The result is:

$$D_e = \pi s/1 - R_1 R_2 \quad (12)$$

From Equation 12 and recalling that the spot spacing is $s$, it is seen that the effective number $N_e$ of spots in the sponding to the Nth spot is given by:

$$N_e = \pi/1 - R_1 R_2 \quad (13)$$

Using Equations 12 and 9 in Equation 6, it is noted that the total attenuation in the near-field intensity corresponding to the $N_e$th spot is given by:

$$I_{N_e}/I_1 = e^{-\alpha D_e} = e^{-2\pi} \quad (14)$$

which represents an attenuation of −24.6 db, or the $\pi$ nepers previously mentioned.

The foregoing analysis establishes the effective aperture size for the exponential distribution, which in turn determines the angular width or spot size in the far-field. The total usable scan angle is determined by the spacing $s$ of the individual beams in the near-field. Specifically, the maximum usable scan angle $\phi_s$ is given by:

$$\phi_s = \lambda/s \quad (15)$$

as previously indicated. By comparing Equations 15, 10 and 13, it is evident that the number of resolvable scan angles, with conventional definition of resolution, is approximately equal to the effective number of near-field spots, as was previously stated.

The quantity of light scattered outside the scanning angle given by Equation 15 is determined primarily by the relation between the spot diameter and the secondary-beam spacing in the near-field. It can be shown that the most efficient arrangement is to have the beams just tangent at the input to mirror 12 such that the spot spacing is equal to the spot diameter. This arrangement avoids any overlap which would allow some light to escape back toward the source; it also permits packing the largest number of near-field spots into a given aperture dimension. At the same time, this arrangement also insures a minimum of light scattered into higher-order diffraction lobes in the far-field pattern.

As an example of a specific arrangement designed to produce at least 1,000 resolvable scan angles in the embodiment of FIGURE 1 modified with FIGURE 3, the following design parameters are given merely by way of illustration and in no sense by way of limitation:

Wavelength $\lambda$—0.6328 micron
Mirror reflectivity $R_1$, $R_2$—$\approx$0.997
Beam diameter $d$—0.1 millimeter
Mirror spacing L—0.5 millimeter
Spot spacing $s$—0.1 millimeter
Effective aperture width $D_e$—$\approx$10.1 centimeters
Effective number of spots $N_e$—$\approx$1,000
Tilt angle $\beta$—5.74 degrees
Scan angle $\phi_s$—$6.328 \times 10^{-3}$ radians
Far-field half-power spot angle $\phi_D$—$6.328 \times 10^{-6}$ radians In this example, the reflectivity is chosen in accordance with Equation 13 to give approximately the number of spots required. The beam diameter is chosen to be equal to the spot spacing which in turn is chosen to give a reasonable aperture width. The mirror spacing and tilt angle, however, must be chosen with due consideration to the electro-optic material employed in the FIGURE 3 embodiment.

From the standpoint of diffraction spreading alone, the minimum practical spacing should be employed, so that the spread of the last secondary beam will not be so large that it exceeds the available aperture. On the other hand, the mirror spacing must be sufficient, of course, to avoid electrical breakdown of the electro-optic material. Also to be avoided is saturation of the linear electro-optic effect by reason of higher-order non-linearities at higher electric field strengths.

To be considered in any design with respect to the lower limit of mirror spacing is that the tilt angle for a given beam spacing varies approximately inversely with mirror spacing. Since it is desired that the light travel approximately parallel to the optic axis of the material in body 24, the tilt angle preferably is kept below about 10°.

In the present state of the art, the material KD*P (deuterated potassium dihydrogen phosphate) is appropriate for the material of body 24. Its half-wave retardation voltage at room temperature is 3400 volts, less than half of that of KDP which is one of the alternatives hereinbefore mentioned. Since the refractive index of KD*P is approximately 1.5, the indicated optical thickness of 0.5 millimeter corresponds to a physical thickness of 0.33 millimeter or 0.013 inch. Consequently, at the half-wave retardation voltage, the electrical field strength is approximately 260 volts per mil which is safely below the breakdown voltage of this material.

While body 24 in accordance with the foregoing parameters is a comparatively thin plate, mechanical problems are avoided by rigidly mounting this plate on a rigid substrate which itself forms or which is coated to form passive mirror 11. Ordinary techniques of grinding, polishing and coating are utilized to insure the necessary tolerance of flatness over the entire plate.

The preceding analysis does not fully account for diffraction spread of the light beam as it propagates back and forth between mirrors 11 and 12. Since the angular divergence of the beam is inversely proportional to the minimum beam diameter, the use of a very small beam at the entrance point of aperture 14 (or prism 22) results in a relatively large divergence angle. Conversely, when a small divergence angle is required, a relatively large beam at the input is indicated; the latter increases the necessary aperture size for a given number of spots. For the exemplary parameters set forth above, the half-angle beam divergence $\theta$ is given by the expression:

$$\theta = \lambda/d \approx 6.328 \times 10^{-3} \text{ radians} \quad (16)$$

The total distance Z travelled by the beam up to the last near-field spot is:

$$Z = 2lN/\cos \beta \approx 1.00 \text{ meters} \quad (17)$$

Equations 16 and 17 yield for the final diameter of the 1,000th beam the value $(Z\theta)$ of 6.3 millimeters. It can thus be seen that, while diffraction spreading of the beam produces considerable overlap between near-field spots, the final beam size is still small enough to be reasonably contained within the aperture selected.

While it is necessary to restrict the beam dimension in the direction of scanning in order to get high resolution within a reasonable aperture dimension, no such restriction is necessary in the direction perpendicular to the scanning direction. A highly desirable arrangement in which diffraction spreading in the scanning direction is held to a minimum is shown in FIGURE 5. To this end, a cylindrical lens 37 is placed between source 10 and unit 27 in order to produce an elliptical beam. Its minor axis corresponds to the previously exemplified value of 0.1 millimeter but its major axis in the transverse direction is considerably larger, of the order of 1 centimeter. As such an elliptical beam progresses through the scanner, its narrow dimension increases from 0.1 millimeter to 0.63 centimeter, while its wider dimension remains essentially unchanged. The output from unit 27 then is passed through another cylindrical lens 38 oriented at right angles to the first in order to focus the beam down to a size of approximately the value of 0.1 millimeter. The beam may then be prepared for entrance into a second scanner 35 for the orthogonal direction as discussed above with reference to FIGURE 6. Finally, after passage through the second scanning apparatus, the standard telescopic arrangement 31, which receives beam 28 through an object lens 29 and eye piece 30, is utilized to project the far-field beam onto screen 32.

As thus far described, the analysis has assumed ideal parallelism of mirrors 11 and 12, and such parallelism is readily achievable to the degree practically necessary. However, when a cylindrical lens effect actually is desired, this may be achieved by deliberately departing from exact parallelism of the mirrors. A slight angle between the mirrors in the scanning direction produces the effect of an additional cylindrical lens acting in the plane of scanning.

It has been seen that the position of the far-field spot depends fundamentally on the optical path difference between two adjacent near-field spots. The three physical parameters which directly enter into the determination of this position are the mirror spacing L, the tilt angle $\beta$ and the radiation wavelength $\lambda$. It has been noted that the sharpness of the far-field spot is also dependent upon the total number of spots or the aperture width. It is of interest, however, to consider only the position of maximum intensity, not its sharpness. Since the physical variables L and $\lambda$ enter into the expressions given as a ratio, it is evident that a fractional change in wavelength $\lambda$ is just as effective in producing a displacement of the far-field spot as is the same fractional change in the mirror spacing L. For this reason, it is evident that the scanning mechanism is dispersive in the sense that the output image position depends upon wavelength. The device is, in fact, a directional filter, since the image position also depends upon the direction of light injection, upon the tilt angle $\beta$.

When the scanning mechanism is utilized in a selective access display beam positioner, the dispersion must either be small enough to be below the resolution limit or else must be compensated to a sufficient degree of accuracy so as not to degrade the resolution. The possible difficulty is emphasized by the fact that the small wavelength difference corresponding to the different longitudinal modes in the conventional helium-neon laser can easily be resolved in a system designed for only approximately 100 lines of resolution. Where a particular application renders such dispersion a significant problem, it is contemplated to overcome it by employing a laser with only a single mode of oscillation. One such laser is the "super mode" laser described by G. A. Massey et al., "Generation of Single-Frequency Light Using the FM Laser," Appl. Phys. Letters, vol. 6, No. 1, pp. 10–11, January 1965. In such use, it is necessary to stabilize the center frequency of the super mode laser in order to prevent drifting and smearing of the projected display. Techniques for such stabilization to the center of the atomic gain profile are set forth by S. E. Harris et al., "Proposed Frequency Stabilization of the FM Laser," Appl. Phys. Letters, vol. 7, No. 7, pp. 185–187, October 1965.

Another way of overcoming the dispersion problem in the selective access beam positioner utilizing a laser having multiple modes is to compensate for the dispersion in the scanning device by inserting an additional optical component designed to produce an equal and opposite dispersion. To this end, a cascade of prisms is disposed following mirror 12. Each prism is of a dispersive material, such as heavy flint glass, and subjects the outgoing beams to a comparatively small angular dispersion amount which is a function of frequency about the average value of the tilt angle $\beta$. The design of the prisms is selected to actually compensate the output beam so that the far-field spot position becomes independent of the frequency of the input light over a range of frequencies sufficient to accommodate all of the actual modes of the laser. An approximate computation of the angular dispersion required for such compensation yields the following expression:

$$\Delta\beta/\Delta\lambda = -1/\lambda \tan \beta = -15.8 \text{ radians/micron} \quad (18)$$

The use of a cascade of prisms is indicated above because the dispersion coefficient of heavy flint glass is only about 0.29 per micron.

As described and claimed in the application of Robert Adler, Ser. No. 571,510, filed Aug. 10, 1966, and assigned to the same assignee as the present application, an alternative method of compensating for dispersion in the scanning device is to insert an echelon transmission grating 38 in the near-field of the secondary beams emerging from mirror 12. The echelon grating, well-known per se, produces a steering of the light beams which depends only on wavelength. Analysis of the echelon grating in this particular use, including the effects of a small error angle $e_0$ in the alignment of the echelon with respect to the optical axis, yields the following expression for the condition of complete dispersion cancellation:

$$(\rho-1) \tan \beta = e_0/\rho + g/t \quad (19)$$

where $\rho$ is the index of refraction of the echelon material, $e_0$ is in radians, $g$ is the echelon step width transverse to the direction of propagation, and $t$ is the echelon step height in the direction of propagation. For the example given previously and utilizing an echelon material having an index of refraction of 1.5, and assuming no alignment error, Equation 19 yields an echelon ratio of step height to step width of twenty. Examination of Equation 19 reveals that the alignment accuracy for such an echelon grating is no more critical than that required for other components in the system.

When the scanning device of the present invention is utilized in image reproduction systems in certain applications, it is desirable to deliberately modify or control the intensity distribution across the aperture. To this end, it may be shown that a deliberate overlapping of the secondary beams emerging from mirror 12 permits a reduction in intensity of the afore-mentioned side lobes. Directly related to the presence of side-lobes and the strength of the tail portions of the intensity distribution of the ultimate beam spot on image screen 32 is the effect of such distribution upon contrast in a resultant image.

Generally speaking, in any such image display system it is possible to alter the design parameters to exchange resolution for contrast. To improve the contrast ratio, it is contemplated to shape the near-field pattern and one approach to this end is analogous to the process of apodering in the art of lens making wherein a lens surface is coated with a material such as gold of varying thickness. As applied to the present invention, a particular embodiment involves varying the reflectivity across the surface of mirrors 11 and 12. Consequently, the reflectivity is tailored so as to reduce the comparative magnitudes of the tail portions of the response curve of FIGURE 8.

One example of this approach is to cause the reflectivity to vary across the mirror so as to produce an intensity distribution curve which exhibits a Gaussian variation, as contrasted with exponential variation of FIGURE 7. It can be shown that this approach sharply increases the contrast ratio.

Figure 9:
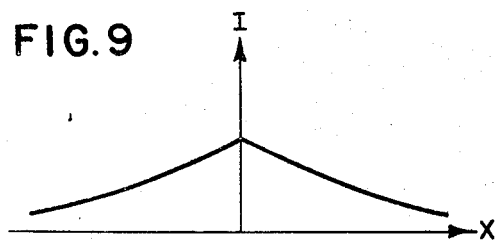

An alternative technique for improvement of contrast ratio is that of utilizing two mirror-pair systems disposed back to back (incorporating a mirror image in FIGURE 1) so that the resultant intensity distribution across the near-field beams is as shown in FIGURE 9, the latter being seen to include a mirror image of FIGURE 7. It can be shown that the far-field response obtained by so including the other symmetric half of the near-field pattern yields a far-field response exhibiting substantially increased contrast ratio.

While particular mirror-pair embodiments have been depicted in FIGURES 2, 3 and 4 for purposes of specific exemplification, the illustration and description with respect to FIGURE 1 is of general applicability to embrace other techniques for establishing the multiplicity of reflections with concomitant creation of the plurality of secondary beams. For example, a still further alternative embodiment relies on the almost complete total reflection of light traversing through a Lummer Gehrcke plate. Another alternative involves the use of a semiconductor depletion region as the cavity which as illustrated is composed of mirrors 11 and 12. An advantage of the semiconductor approch is that the fields in the depletion region may be made extremely strong. Variation in the effective optical path length is achieved either by changing the width of the depletion layer electrically or by utilizing the electrooptical effect in the semiconductor which is analogous to that in body 24 in FIGURE 3.

It has thus been seen that the present invention involves a rather simple, in terms of a number of elements, mirror-pair system so arranged as to coact with time-coherent light to permit taking advantage of certain phase relationships between different quantities of such light. Being so simple, it is inherently capable of achieving extremely high scanning speeds. It also embraces a large variety of individually different features advantageously utilizable in systems incorporating the basic elements. In application as a light beam scanner, implementation of the invention basically involves only the provision of a pair of highly-reflective mirrors, properly oriented relative to the incident light in question, together with means for varying the effective optical path length between those mirrors. As a scanning system, utilization of the present invention enables the high-resolution development of an image.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A phased-array coherent light scanning system comprising:
 a pair of mutually-facing substantially parallel reflective surfaces, one of which is partially transmissive of light;
 a laser for producing a primary beam of coherent light;
 means for deflecting said coherent primary beam comprising means for directing it into the interspace between said mutually-facing surfaces at an acute incidence angle to produce multiple internal reflections within said interspace and transmit a plurality of differently-phased substantially parallel secondary beams in the near optical field beyond said one surface, and further comprising means for varying the effective optical path length between said mutually-facing surfaces to change the relative phase relations between different ones of said near-field secondary beams and thus to change the propagation direction of the far-field beam resulting from said near-field secondary beams.

2. A phased-array coherent light scanning system according to claim 1, in which said means for varying the optical path length includes means for varying the physical spacing between said reflecting surfaces.

3. A scanning system according to claim 2, in which said means for varying the optical path length includes a piezoelectric transducer to which at least one of said reflecting surfaces is affixed.

4. A scanning system according to claim 1, in which said means for varying the optical path length includes a body of electro-optical material on respective opposed surfaces of which said reflective surfaces are individually affixed.

5. A scanning system according to claim 1, in which said mutually-facing reflective surfaces are spaced a fixed distance apart and said means for varying the optical path length includes a movable element disposed between said reflective surfaces for changing the optical path length therebetween.

6. A scanning system according to claim 1, in which one of said reflective surfaces includes means defining an aperture therein and said primary light beam is directed therethrough into the space between the reflective surfaces.

7. A scanning system according to claim 1, wherein said deflecting means includes a prism disposed essentially between said reflective surfaces and effective to redirect onto said one reflective surface said primary beam which approaches said reflective surfaces from a direction generally parallel with the planes of the reflective surfaces.

8. A scanning system according to claim 1, wherein the spacing between said secondary beams is greater than their individual diameters.

9. A scanning system according to claim 1, in which the action of said reflective surface pair is angularly dispersive and which includes means for substantially compensating such dispersion.

10. A scanning system according to claim 9, in which said compensating means includes at least one prism disposed in the path of said primary beam for predistorting the latter an amount rendering said propagation direction substantially independent of the wavelength of said light.

11. A scanner according to claim 1, wherein said secondary beams are substantially tangent to each other.

12. A phased-array coherent light scanning system comprising:
 a pair of mutually-facing substantially parallel reflective surfaces, one of which is partially transmissive of light;
 a laser for producing a primary beam of coherent light;
 means for deflecting said coherent primary beam comprising means for directing it into the interspace between said mutually-facing surfaces at an acute incidence angle to produce multiple internal reflections within said interspace and transmit a plurality of differently-phased substantially parallel secondary beams in the near optical field beyond said one surface, and further comprising means for varying the frequency of said beam of coherent light to change the relative phase relations between different ones of said near-field secondary beams and thus to change the propagation direction of the far-field beam resulting from said near-field beams.

13. A light beam scanner comprising:
 a pair of mutually-facing substantially parallel spaced mirrors one of which is partially transmissive of light;
 means for projecting a primary beam of time-coherent light;
 means for orienting said mirror pair relative to said primary beam to establish multiple reflections of said primary beam between the mirrors with a portion of said light being transmitted through said one mirror at each point of such reflections thereon, to create a corresponding plurality of substantilly parallel secondary beams in the near-field beyond said one mirror;
 means for varying the effective optical path length between said mirrors; and
 a second pair of mirrors similar to the first and disposed in the path of said secondary beams at an angle therewith establishing multiple reflections of said secondary beams between said second pair of mirrors with a portion of the secondary beams being transmitted through one of the mirrors of said second pair at each point of reflection therefrom to create a corresponding plurality of substantially parallel tertiary beams in the near-field beyond said second pair, together with means for varying the effective optical path length between said second pair to alter the propagation direction of the far-field beam resulting from said tertiary beams in a direction generally transverse to that occasioned as a result of the action on the primary beam by the first pair of mirrors.

14. A scanner according to claim 13 in which said primary beam has an elongated transverse cross-section in a direction transverse to the direction of multiple reflections in said first mirror pair and including a cylindrical lens disposed in the path of said secondary beams to compensate the action of said mirror pair.

15. A light beam scanner comprising:
a pair of mutually-facing substantially parallel spaced mirrors one of which is partially transmissive of light;
means for projecting a primary beam of time-coherent light;
means for orienting said mirror pair relative to said primary beam to establish multiple reflections of said primary beam between the mirrors with a portion of said light being transmitted through said one mirror at each point of such reflections thereon, to create a corresponding plurality of substantially parallel secondary beams in the near-field beyond said one mirror;
means for varying the effective optical path length between said mirrors to alter the propagation direction of the far-field beam resulting from said secondary beams; and
means for modifying the individual near-field intensity of said secondary beams to create a Gaussian intensity distribution across the resulting far-field beam.

16. A light beam scanner comprising:
a pair of mutually-facing substantially parallel spaced mirrors one of which is partially transmissive of light;
means for projecting a primary beam of time-coherent light;
means for orienting said mirror pair relative to said primary beam to establish multiple reflections of said primary beam between the mirrors with a portion of said light being transmitted through said one mirror at each point of such reflections thereton, to create a corresponding plurality of substantially parallel secondary beams in the near-field beyond said one mirror;
means for varying the effective optical path length between said mirrors to alter the propagation direction of the far-field beam resulting from said secondary beams; and
a first cylindrical lens disposed in the path of said primary beam intermediate said means for projecting and said pair of mirrors to form the latter into a beam having an elliptical shape in cross-section and a second cylindrical lens disposed in the path of said secondary beams to compensate the elliptical effect of the first lens.

17. A light beam scanner comprising:
a pair of mutually-facing substantially parallel spaced mirrors one of which is partially transmissive of light;
means for projecting a primary beam of time-coherent light;
means for orienting said mirror pair relative to said primary beam to establish multiple reflections of said primary beam between the mirrors with a portion of said light being transmitted through said one mirror at each point of such reflections thereon, to create a corresponding plurality of substantially parallel secondary beams in the near-field beyond said one mirror;
at least one of said mirrors having a reflectivity which varies in the scanning direction to modify the distribution of intensity among said secondary beams; and
means for varying the effective optical path length between said mirrors to alter the propagation direction of the far-field beam resulting from said secondary beams.

18. A light beam scanner comprising:
a pair of mutually-facing substantially parallel spaced mirrors one of which is partially transmissive of light;
means for projecting a primary beam of time-coherent light;
means for orienting said mirror pair relative to said primary beam to establish multiple reflections of said primary beam between the mirrors with a portion of said light being transmitted through said one mirror at each point of such reflections thereon, to create a corresponding plurality of substantially parallel secondary beams in the near-field beyond said one mirror;
means for varying the effective optical path length between said mirrors to alter the propagation direction of the far-field beam resulting from said secondary beams; and
means for establishing a distribution of intensity in the near-field among said secondary beams in which the intensity decreases symmetrically to either side of an intermediate one of said secondary beams.

References Cited

UNITED STATES PATENTS

| 2,359,964 | 10/1944 | Turner. | |
| 2,534,846 | 12/1950 | Ambrose et al. | |
| 3,243,722 | 3/1966 | Billings | 331—94.5 |
| 3,325,646 | 6/1967 | Reichel et al. | 250—199 |
| 3,354,407 | 11/1967 | Howling | 331—94.5 |

FOREIGN PATENTS

| 26,669 | 8/1931 | Australia. |

RONALD L. WIBERT, Primary Examiner

P. K. GODWIN, JR., Assistant Examiner

U.S. Cl. X.R.

350—163, 299